(12) United States Patent
Zhao

(10) Patent No.: US 12,422,114 B1
(45) Date of Patent: Sep. 23, 2025

(54) TEMPERATURE MEASURABLE FOUNTAIN LAMP

(71) Applicant: SICHUAN COOTWAY TECHNOLOGY CO., LTD., Sichuan (CN)

(72) Inventor: Chunhai Zhao, Sichuan (CN)

(73) Assignee: SICHUAN COOTWAY TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 19/052,721

(22) Filed: Feb. 13, 2025

(30) Foreign Application Priority Data

Feb. 10, 2025 (CN) .......................... 202520205311.5

(51) Int. Cl.
| | | |
|---|---|---|
| *F21S 9/02* | (2006.01) | |
| *B05B 17/08* | (2006.01) | |
| *F21V 23/00* | (2015.01) | |
| *F21V 23/06* | (2006.01) | |
| *F21V 31/00* | (2006.01) | |
| *F21W 121/02* | (2006.01) | |
| *F21Y 115/10* | (2016.01) | |
| *G01K 1/02* | (2021.01) | |
| *G01K 1/08* | (2021.01) | |

(52) U.S. Cl.
CPC ................ *F21S 9/02* (2013.01); *B05B 17/08* (2013.01); *F21V 23/005* (2013.01); *F21V 23/06* (2013.01); *F21V 31/005* (2013.01); *G01K 1/028* (2013.01); *G01K 1/08* (2013.01); *F21W 2121/02* (2013.01); *F21Y 2115/10* (2016.08)

(58) Field of Classification Search
CPC .......... F21S 9/02; B05B 17/08; F21V 23/005; F21V 23/06; F21V 31/005; G01K 1/028; G01K 1/08; F21W 2121/02; F21Y 2115/10
See application file for complete search history.

(56) References Cited

U.S. PATENT DOCUMENTS

| | | | | |
|---|---|---|---|---|
| 2006/0032936 A1* | 2/2006 | Proch | .................... | B05B 17/085 |
| | | | | 239/69 |
| 2011/0012356 A1* | 1/2011 | Burnham | ................ | F21S 9/046 |
| | | | | 290/52 |
| 2014/0273052 A1* | 9/2014 | Reddy | .................... | G01N 21/77 |
| | | | | 436/164 |
| 2020/0085005 A1* | 3/2020 | Yoo | ........................ | A01K 7/025 |
| 2022/0341554 A1* | 10/2022 | Xu | .......................... | F21S 9/037 |

* cited by examiner

*Primary Examiner* — Tsion Tumebo

(57) ABSTRACT

A temperature measurable fountain lamp includes a housing, a temperature measuring device, a pump device, a lighting device, and a control motherboard. The housing is provided with an accommodating cavity and a water inlet opening, and the water inlet opening is used for allowing liquid to enter the accommodating cavity. The temperature measuring device includes a probe and a display electrically connected to the probe. The probe is positioned on a lower side of the housing. The display is positioned on the housing. The probe and one part of the housing are used for being placed into the liquid, so that the probe is capable of being used for measuring a temperature value of the liquid. The display is used for displaying the temperature value of the liquid. The pump device is installed in the accommodating cavity. The lighting device is installed inside the accommodating cavity.

19 Claims, 7 Drawing Sheets

TEMPERATURE MEASURABLE FOUNTAIN LAMP

CROSS-REFERENCE TO RELATED APPLICATIONS

The application claims priority of Chinese patent application 2025202053115, filed on Feb. 10, 2025, which is incorporated herein by reference in its entireties.

TECHNICAL FIELD

The present invention relates to a temperature measurable fountain lamp applied in the field of lighting fixtures.

BACKGROUND ART

Fountain lamps are decorative lighting fixtures that combine fountain function and lighting function, and are widely used in fields such as home, gardening, and landscape decoration. Fountain lamps can not only create a beautiful fountain effect and create a good water landscape atmosphere, but also provide lighting functions to add decorative effects to a space. With the improvement of people's requirements for the quality of life, the functions of fountain lamps are constantly enriching and improving.

At present, the existing fountain lamps on the market only have simple fountain and lighting functions, and lack measurement and display functions for water temperature, which cannot meet users' measurement needs for water temperature. Moreover, the existing fountain lamps are not convenient enough in terms of function switching and operation, lacking effective control over a spray mode, which affects the practicality and user experience of the product.

SUMMARY

In order to solve the above-mentioned problems in the prior art, a temperature measurable fountain lamp is provided in the present invention. The temperature measurable fountain lamp can measure and display water temperature in real time by arranging a temperature measuring device on a housing. By rational structural design, a waterproof and sealing performance of the product has been improved. Through the cooperation of pressing members and a control motherboard, convenient control of a spraying mode and a lighting mode is achieved, making the product more practical and user-friendly.

The technical solution adopted by the present invention to solve its technical problems is as follows.

A temperature measurable fountain lamp includes: a housing, wherein the housing is provided with an accommodating cavity and a water inlet opening, and the water inlet opening is used for allowing liquid to enter the accommodating cavity; a temperature measuring device, wherein the temperature measuring device includes a probe and a display electrically connected to the probe, the probe is positioned on a lower side of the housing, the display is positioned on the housing, the probe and one part of the housing are used for being placed into the liquid, so that the probe is capable of being used for measuring a temperature value of the liquid, and the display is used for displaying the temperature value of the liquid; a pump device, wherein the pump device is installed in the accommodating cavity, and the pump device is in communication with the water inlet opening for spraying the liquid to form a fountain; a lighting device, wherein the lighting device is installed inside the accommodating cavity for emitting light out of the housing; and a control motherboard, wherein the control motherboard is electrically connected to the lighting device, the pump device, the probe, and the display, so that the lighting device, the pump device, the probe, and the display are controllably driven.

Furthermore, the housing includes an upper housing and a lower housing. A first installation opening is defined in an upper side of the lower housing. The control motherboard, the lighting device, and the pump device are all arranged in the accommodating cavity through the first installation opening. The probe is partially positioned in the accommodating cavity and partially passes through a bottom portion of the lower housing to extend out of the lower housing. The display is partially positioned inside the accommodating cavity and partially extends out of the upper housing. The upper housing is configured for sealing and covering the lower housing through the first installation opening.

Furthermore, the pump device is provided with a conveying pipeline in communication with the water inlet opening. The conveying pipeline is used for conveying liquid. A top portion of the upper housing is equipped with a water outlet portion. The upper housing is provided with a first installation groove adapted to the water outlet portion. The water outlet portion is clamped in the first installation groove, and the water outlet portion is in communication with the conveying pipeline.

Furthermore, the lower housing further includes a sealing ring. When the upper housing seals and covers the first installation opening, an inner side wall of the first installation opening and an outer side wall of the upper housing press the sealing ring, so that the sealing ring presses and seals the upper housing inside the first installation opening.

Furthermore, a bottom inner wall of the lower housing is provided with a second installation groove, a sensing plate, and a pressing plate. The sensing plate is installed in the second installation groove. The sensing plate is electrically connected to the control motherboard. The pressing plate is positioned above the sensing plate. Two ends of the pressing plate are respectively fixed to the second installation groove for fixing the sensing plate in the second installation groove.

Furthermore, a top portion of the upper housing is also provided with a plurality of pressing members. The control motherboard is provided with buttons corresponding to the pressing members. The upper housing is provided with a second installation opening. The pressing members and the second installation opening are both positioned above the buttons. The pressing members are configured for sealing and covering the second installation opening.

Furthermore, the temperature measurable fountain lamp further includes a power storage module. The power storage module is electrically connected to the control motherboard, and the power storage module is installed in the accommodating cavity through the first installation opening.

Furthermore, an identical side of the upper housing and the lower housing extends outward to form a hollow flat structure. An inner portion of the flat structure is in communication with the first installation opening.

Furthermore, the pressing members include a first pressing member, and the buttons include a first button corresponding to the first pressing member. The first pressing member drives the first button under an external force for switching between a continuous water spraying mode and an intermittent water spraying mode.

Furthermore, the upper housing is also provided with a charging interface and a cover. The charging interface is electrically connected to the control motherboard. The charging interface is used for providing electrical energy to the power storage module. The upper housing is also provided with a third installation opening. The charging interface is provided in the third installation opening. The cover is used for covering the third installation opening.

Furthermore, the lower housing further includes a floating member. The floating member is arranged inside the flat structure through the first installation opening.

Furthermore, the pressing members further include a second pressing member. The buttons further include a second button corresponding to the second pressing member. The second button is used for switching a temperature display mode.

Furthermore, the control motherboard is equipped with a second connecting member. The control motherboard is connected to the upper housing through the second connecting member.

Furthermore, the control motherboard is further provided with sockets. The display is electrically connected to the control motherboard through the sockets.

Furthermore, the display is provided with pins. The pins are inserted into the sockets to electrically connect the display to the control motherboard.

Furthermore, the lighting device is an LED light. The LED light is positioned on a lower side of the control motherboard, and a light emitting surface of the LED light is arranged towards a direction of a lower side of the lower housing.

Furthermore, the LED light is capable of emitting colored light with alternating flashing colors under the control of the control motherboard.

Furthermore, the water inlet opening is defined in the bottom portion of the lower housing.

Furthermore, a bottom portion of the housing is provided with a plurality of support portions.

Furthermore, the housing is made of transparent material.

Beneficial effects of the present invention are as follows. The temperature measurable fountain lamp is provided in the present invention. By installing the temperature measuring device on the housing, including the probe positioned on the lower side of the housing and the display positioned on the housing, the temperature value of the liquid can be measured and displayed in real time when the probe and one part of the housing are inserted into the liquid, which compensates for the lack of temperature measurement and display functions in existing fountain lamps, and improves product functionality. The structural design of installing the pump device in the accommodating cavity and communicating the pump device with the water inlet opening enables the cyclic spraying of the liquid, creating a fountain effect. At the same time, the lighting device is installed inside the accommodating cavity and emits light out of the housing, providing lighting function while creating a good visual effect. By electrically connecting the control motherboard to the lighting device, the pump device, and the temperature measuring device, centralized control of each functional module has been achieved. The fountain effect, lighting effect, and temperature display can be adjusted as needed, making it easy to operate and use, and improve the practicality of the product.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
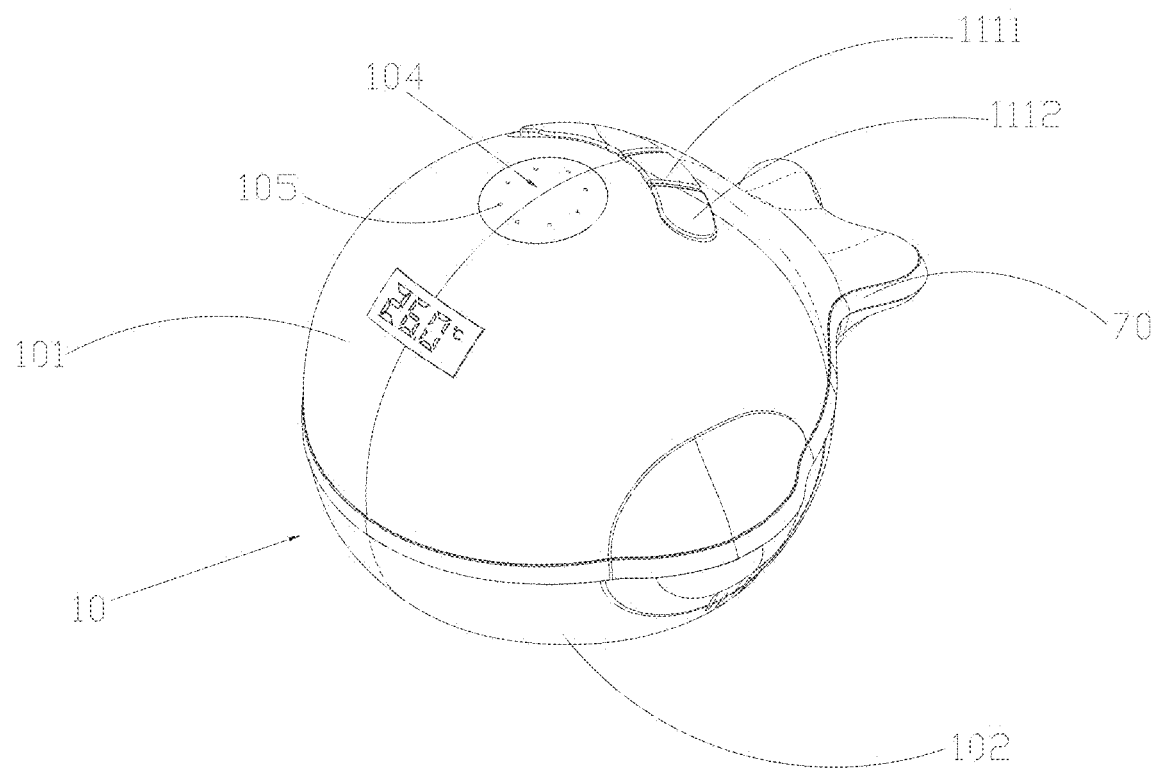
FIG. 1 is a schematic diagram of an overall structure of a temperature measurable fountain lamp according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
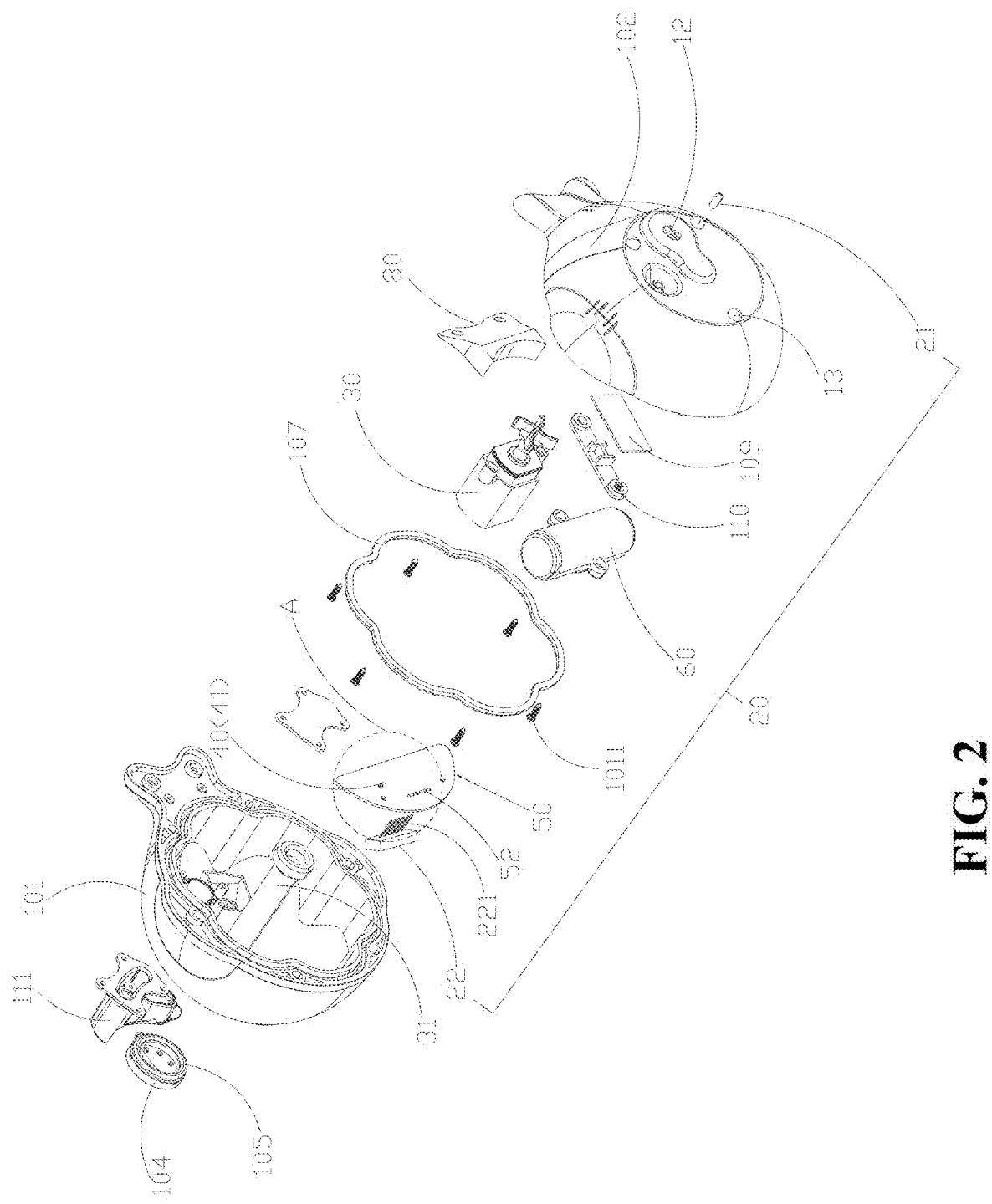
FIG. 2 is a first exploded view of a temperature measurable fountain lamp according to the present invention.
Figure 3:
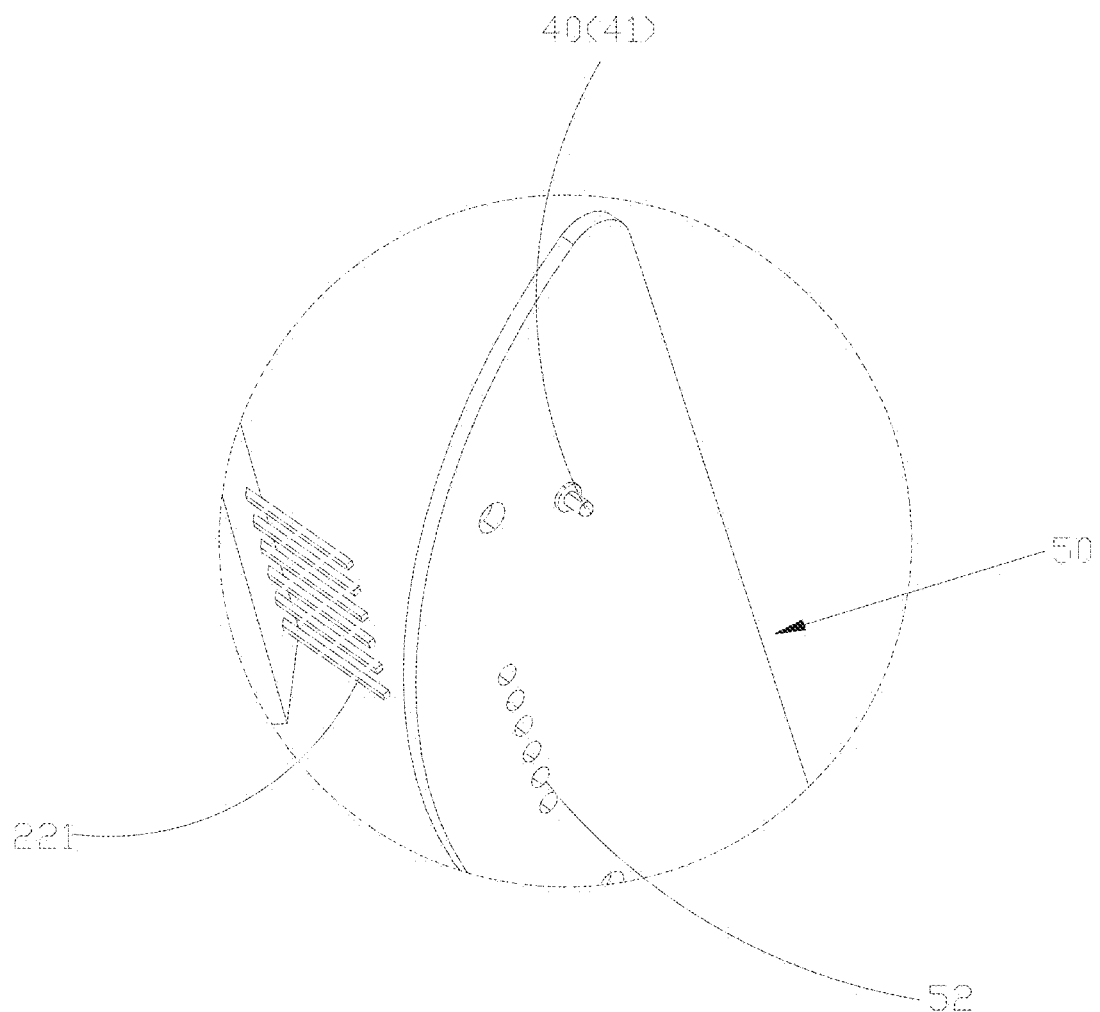
FIG. 3 is an enlarged view of area A in FIG. 2.
Figure 4:
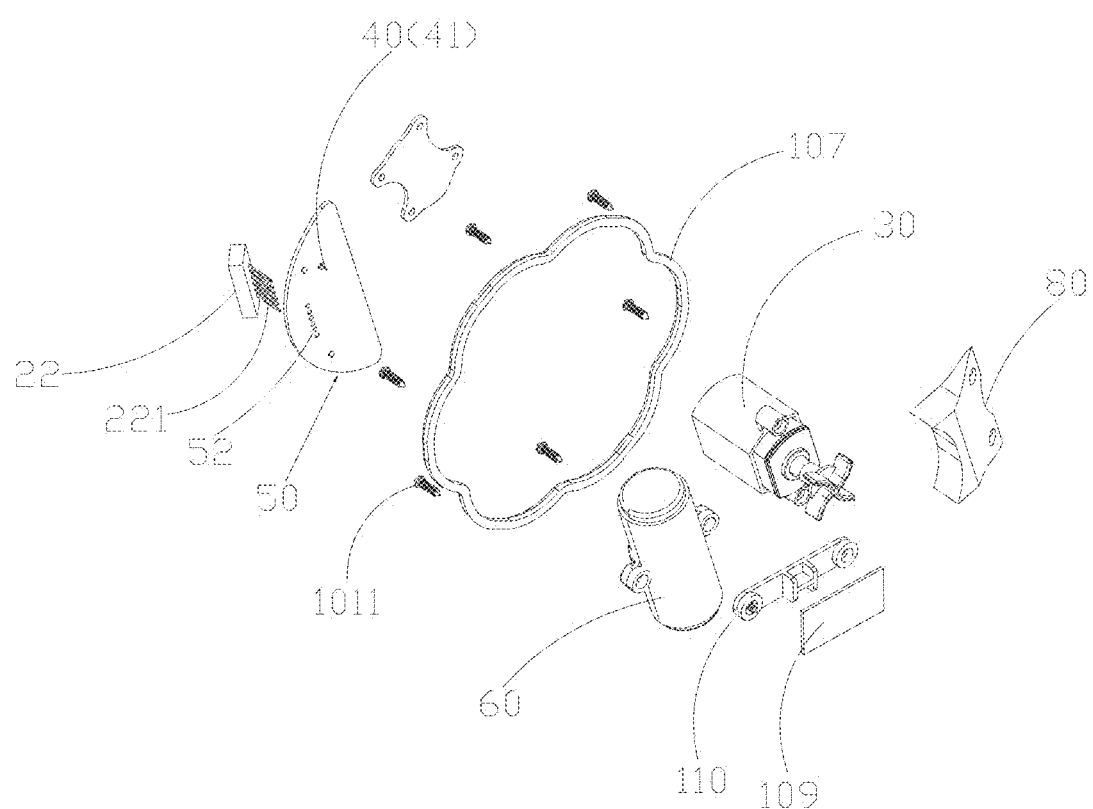
FIG. 4 is a second exploded view of a temperature measurable fountain lamp according to the present invention.
Figure 5:
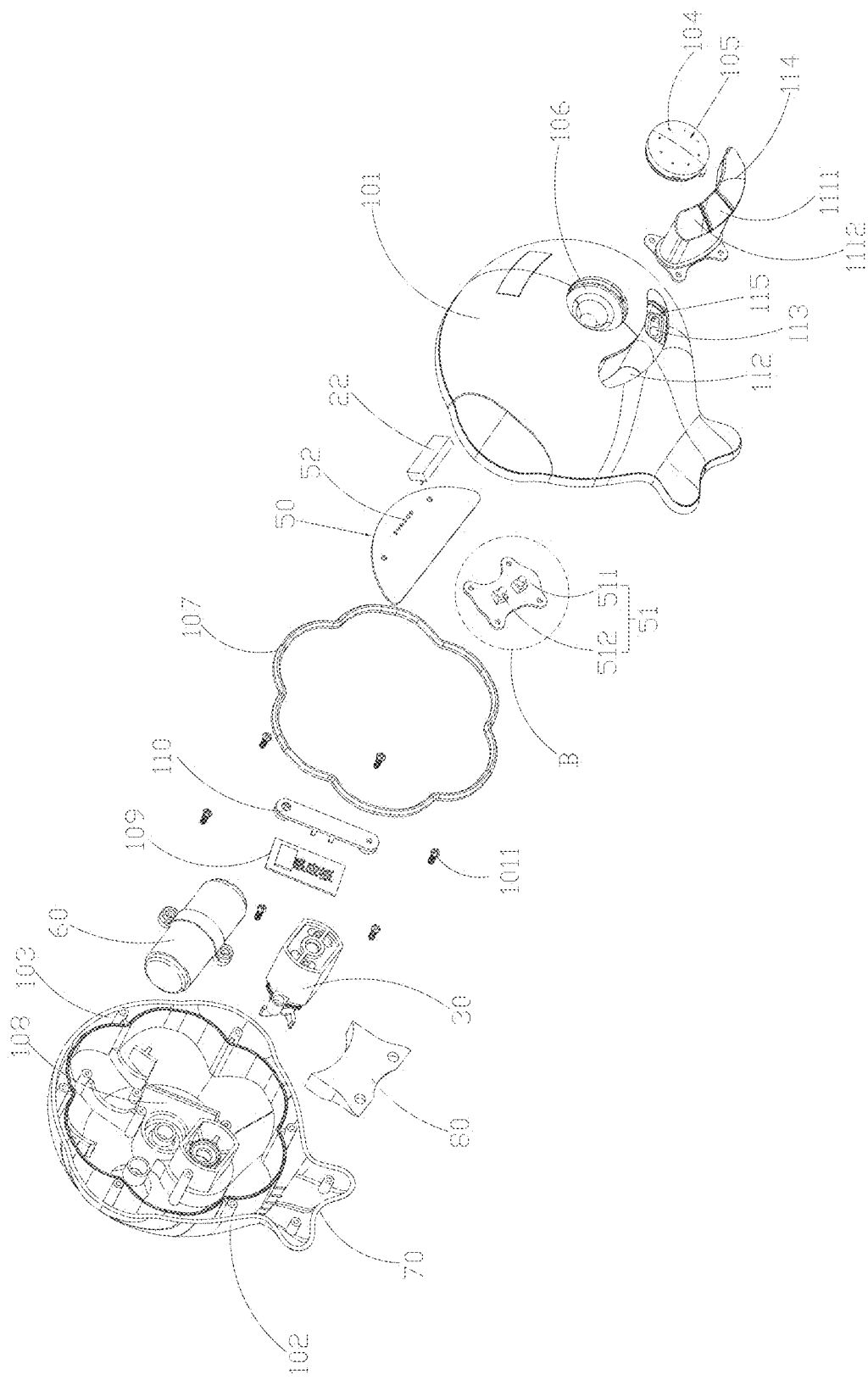
FIG. 5 is a third exploded view of a temperature measurable fountain lamp according to the present invention.
Figure 6:
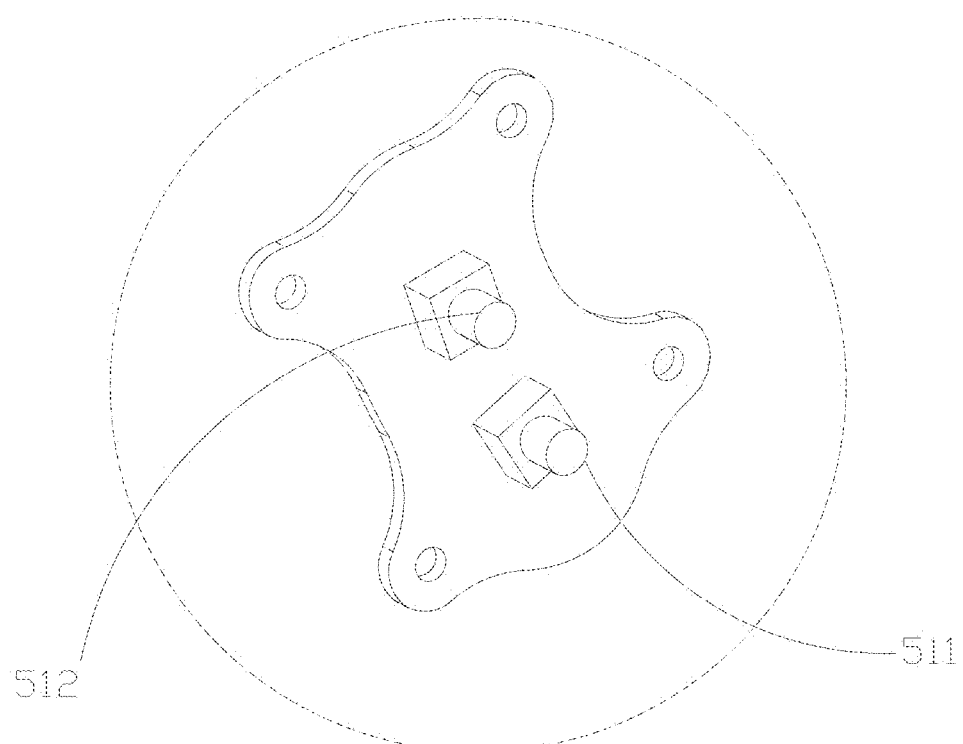
FIG. 6 is an enlarged view of area B in FIG. 5.
Figure 7:
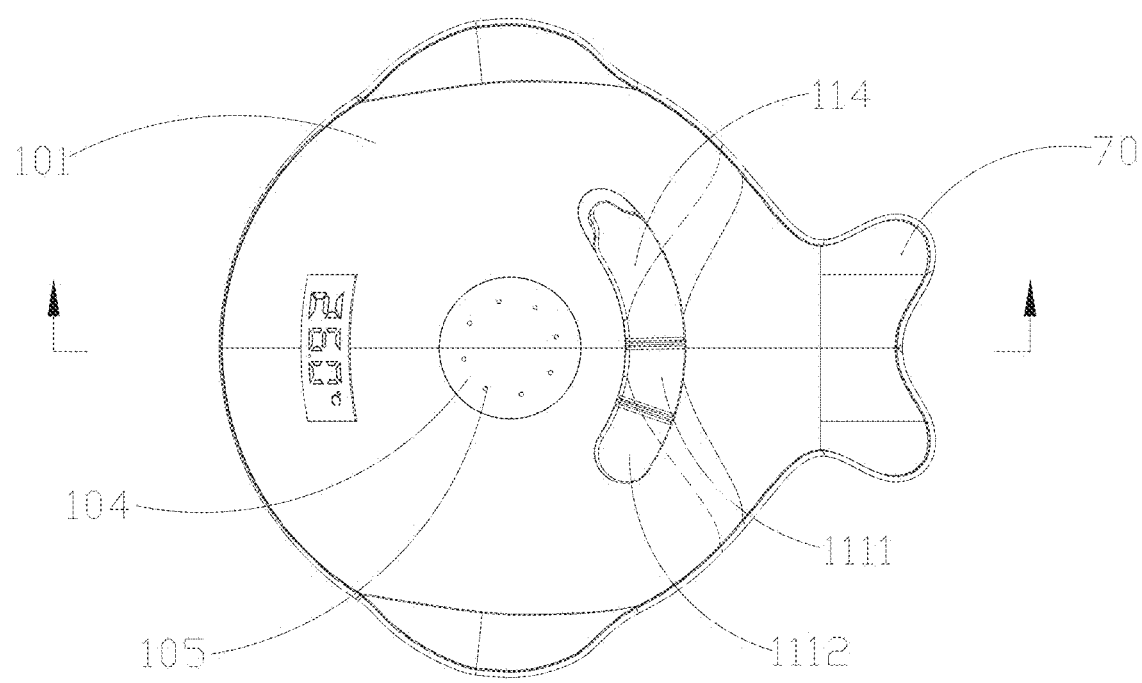
FIG. 7 is a top view of a temperature measurable fountain lamp according to the present invention.
Figure 8:
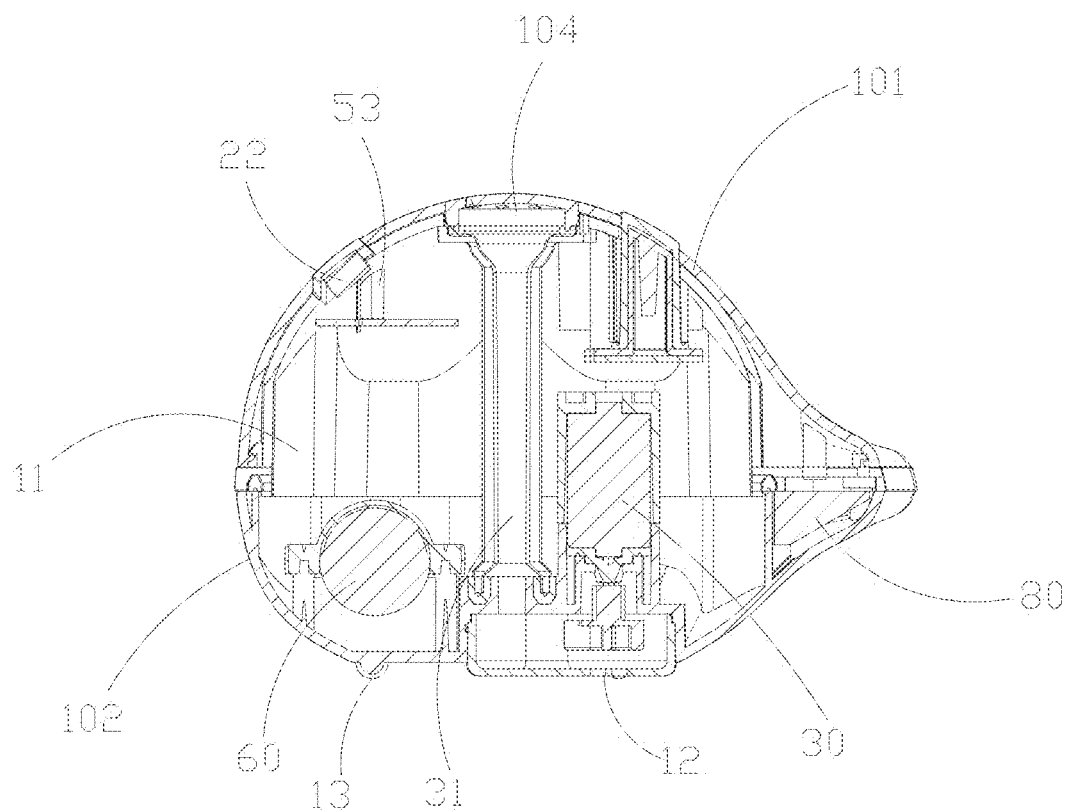
FIG. 8 is a cross-sectional view of FIG. 7.

Referring to FIGS. 1-8, a temperature measurable fountain lamp is provided in the present invention. The temperature measurable fountain lamp includes: a housing 10, wherein the housing 10 is provided with an accommodating cavity 11 and a water inlet opening 12, and the water inlet opening 12 is used for allowing liquid to enter the accommodating cavity 11; a temperature measuring device 20, wherein the temperature measuring device 20 includes a probe 21 and a display 22 electrically connected to the probe 21, the probe 21 is positioned on a lower side of the housing 10, the display 22 is positioned on the housing 10, the probe 21 and one part of the housing 10 are used for being placed into the liquid, so that the probe 21 is capable of being used for measuring a temperature value of the liquid, and the display 22 is used for displaying the temperature value of the liquid; a pump device 30, wherein the pump device 30 is installed in the accommodating cavity 11, and the pump device 30 is in communication with the water inlet opening 12 for spraying the liquid to form a fountain; a lighting device 40, wherein the lighting device 40 is installed inside the accommodating cavity 11 for emitting light out of the housing 10; and a control motherboard 50, wherein the control motherboard 50 is electrically connected to the lighting device 40, the pump device 30, and the temperature measuring device 20, so that the lighting device 40, the pump device 30, and the temperature measuring device 20 are controllably driven.

Through the arrangement of the above structure, when in use, the housing 10 is partially immersed in the liquid, the probe 21 can measure the temperature of the liquid, and the temperature value is displayed through the display 22. At the same time, the pump device 30 sucks in liquid through the water inlet opening 12 and sprays the liquid to form a fountain effect, the lighting device 40 provides illumination and creates a visual effect. The control motherboard 50 is capable of controlling the working status of each functional module.

In this embodiment, the housing 10 includes an upper housing 101 and a lower housing 102. A first installation opening 103 is defined in an upper side of the lower housing 102. The control motherboard 50, the lighting device 40, and the pump device 30 are all arranged in the accommodating cavity 11 through the first installation opening 103. An upper end portion of the probe 21 is positioned in the accommodating cavity 11 and is electrically connected to the control motherboard 50. A lower end portion of the probe 21 passes through a bottom portion of the lower housing 102 and extends out of the lower housing 102. A lower end portion of the display 22 is positioned inside the accommodating cavity 11 and is electrically connected to the control motherboard 50. An upper end portion of the display 22 extends out of the upper housing 101. The upper housing 101 is configured for sealing and covering the lower housing 102 through the first installation opening 103. Through the arrangement of the above structure, the probe 21 extends outward from the bottom portion of the lower housing 102, and can be installed in two ways: a first way is that the probe 21 slightly extends beyond a bottom outer surface of the lower housing 102; a second way is that the probe 21 is flush with the bottom outer surface of the lower housing 102. The second way is preferred, that is, a portion of the probe 21 in contact with the liquid is flush with the bottom outer surface of the lower housing 102. This design facilitates accurate measurement of the temperature of the liquid. The display 22 extends from an outside of the upper housing 101 and can be placed at any position of the upper housing 101, but is preferably placed directly above the upper housing 101 to facilitate better observation of the temperature of the liquid by a user. At the same time, the probe 21 and the display 22 are both electrically connected to the control motherboard 50 to ensure accurate transmission of a signal. A plurality of first connecting members 1011 are also provided at a connection between the upper housing 101 and the lower housing 102. Through the first connecting members 1011, the upper housing 101 can more tightly seal and cover the lower housing 102 through the first installation opening 103, achieving overall sealing and waterproofing.

In this embodiment, the pump device 30 is provided with a conveying pipeline 31 in communication with the water inlet opening 12. The conveying pipeline 31 is used for conveying liquid. A top portion of the upper housing 101 is equipped with a water outlet portion 104. The upper housing 101 is provided with a first installation groove 106 adapted to the water outlet portion 104. The water outlet portion 104 is clamped in the first installation groove 106, and the water outlet portion 104 is in communication with the conveying pipeline 31. Preferably, the water outlet portion 104 is hollowed out to form a plurality of water outlet openings 105, and the liquid is transported through the conveying pipeline 31 to the water outlet openings 105 and sprayed out, thus forming a fountain effect.

In this embodiment, the lower housing 102 further includes a sealing ring 107. When the upper housing 101 seals and covers the first installation opening 103, an inner side wall of the first installation opening 103 and an outer side wall of the upper housing 101 press the sealing ring 107, so that the sealing ring 107 presses and seals the upper housing 101 inside the first installation opening 103. Through the arrangement of the above structure, the arrangement of the sealing ring 107 further enhances the sealing effect between the upper housing and the lower housing, effectively preventing liquid infiltration.

In this embodiment, a bottom inner wall of the lower housing 102 is provided with a second installation groove 108, a sensing plate 109, and a pressing plate 110. The sensing plate 109 is installed in the second installation groove 108. The sensing plate 109 is electrically connected to the control motherboard 50. The pressing plate 110 is positioned above the sensing plate 109. Two ends of the pressing plate 110 are respectively fixed to the second installation groove 108 for fixing the sensing plate 109 in the second installation groove 108. Through the arrangement of the above structure, the sensing plate 109 can be stably installed in the second installation groove 108, and can be fixed by the pressing plate 110, so that the sensing plate 109 is capable of sensing whether the product is immersed in water. When the product is placed on a water surface, the sensing plate 109 detects the presence of the water and transmits a signal to the control motherboard 50, and the the control motherboard 50 controls the product to start working. When the product leaves the water surface, the sensing plate 109 detects the product leaving the water surface and transmits a signal to the control motherboard 50, the control motherboard 50 controls the product to stop working, thereby achieving automatic control of the product, and improving safety and convenience of use.

In this embodiment, a top portion of the upper housing 101 is also provided with a plurality of pressing members 111. The control motherboard 50 is provided with buttons 51 corresponding to the pressing members 111. The upper housing 101 is provided with a second installation opening 112. The pressing members 111 and the second installation opening 112 are both positioned above the buttons 51. The pressing members 111 are configured for sealing and covering the second installation opening 112. Through the arrangement of the above structure, the use of the pressing members 111 in conjunction with the buttons 51 achieves convenient control of product functions and maintains good sealing.

In this embodiment, the temperature measurable fountain lamp further includes a power storage module 60. The power storage module 60 is electrically connected to the control motherboard 50, and the power storage module 60 is installed in the accommodating cavity 11 through the first installation opening 103. Through the arrangement of the above structure, the power storage module 60 provides electrical energy to the product, allowing the product to be used independently and improving portability of the product.

In this embodiment, an identical side of the upper housing 101 and the lower housing 102 extends outward to form a hollow flat structure 70. An inner portion of the flat structure 70 is in communication with the first installation opening 103. Preferably, after the upper housing 101 covers the lower housing 102, an overall shape is whale shaped, and the flat structure 70 is in a fish tail shape, which not only increases the beauty of the product, but also enhances the stability of the product in water.

In this embodiment, the pressing members 111 include a first pressing member 1111, and the buttons 51 include a first button 511 corresponding to the first pressing member 1111. The first pressing member 1111 drives the first button 511 under an external force for switching between a continuous water spraying mode and an intermittent water spraying mode. Preferably, a water spraying height of the continuous water spraying mode and a water spraying height of the intermittent water spraying mode are both from 15 centimeters to 20 centimeters. In the continuous water spraying mode, the liquid is in a continuous spraying state. In the intermittent water spraying mode, the liquid is in an intermittent spraying state. The user can switch according to a need, enhancing the fun and practicality of the product.

In this embodiment, the upper housing 101 is also provided with a charging interface 113 and a cover 114. The charging interface 113 is electrically connected to the control motherboard 50. The charging interface 113 is used for providing electrical energy to the power storage module 60. The upper housing 101 is also provided with a third installation opening 115. The charging interface 113 is provided in the third installation opening 115. The cover 114 is used for covering the third installation opening 115. Through the arrangement of the above structure, when it is necessary to charge the power storage module 60, the cover 114 can be opened for charging. After charging is completed, the cover 114 seals and covers the third installation opening 115, which can effectively prevent liquid from entering an inner portion of the housing through the charging interface 113, ensuring the waterproof performance of the product during use.

In this embodiment, the lower housing 102 further includes a floating member 80. The floating member 80 is arranged inside the flat structure 70 through the first installation opening 103. The arrangement of the floating member 80 enables the product to maintain a stable float in water, improving the stability of the product.

In this embodiment, the pressing members 111 further include a second pressing member 1112. The buttons 51 further include a second button 512 corresponding to the second pressing member 1112. The second button 512 is used for switching a temperature display mode. Specifically, the second button 512 is used for switching between Celsius and Fahrenheit. When the second pressing member 1112 drives the second button 512 to act under an external force, a temperature unit displayed on the display 22 will switch between Celsius "° C." and Fahrenheit "OF", making it convenient for different users to choose an appropriate temperature unit for display according to their own needs. It can be understood that when the display 22 shows Celsius, if the user presses the second button 1112, the temperature unit on the display 22 will switch from Celsius to Fahrenheit. On the contrary, when the display 22 shows Fahrenheit, if the user presses the second button 1112, the temperature unit on the display 22 will switch from Fahrenheit to Celsius.

In this embodiment, the control motherboard 50 is equipped with a second connecting member 53. The control motherboard 50 is connected to the upper housing 101 through the second connecting member 53. This connection structure ensures a stable installation of the control motherboard 50.

In this embodiment, the control motherboard 50 is further provided with sockets 52. The display 22 is electrically connected to the control motherboard 50 through the sockets 52. The above structure facilitates the installation and replacement of the display 22, improving the maintainability of the product.

In this embodiment, the display 22 is provided with pins 221. The pins 221 are inserted into the sockets 52 to electrically connect the display 22 to the control motherboard 50. The plug-in structure of the pins 221 and the sockets 52 makes the electrical connection more stable and reliable.

In this embodiment, the lighting device 40 is an LED light 41. The LED light 41 is positioned on a lower side of the control motherboard 50, and a light emitting surface of the LED light 41 is arranged towards a direction of a lower side of the lower housing 102. By arranging the light emitting surface of the LED light 41 towards the direction of the lower side of the lower housing 102, light emitted by the LED light 41 can be irradiated downwards and uniformly scattered to the entire housing 10. This not only illuminates the housing 10, but also enable the housing 10 to present a soft light effect as a whole, thereby achieving a better decorative effect.

In this embodiment, the LED light 41 is capable of emitting colored light with alternating flashing colors under the control of the control motherboard 50. Preferably, by controlling the LED light 41, seven different colors of light can be emitted, thereby enhancing the decorative effect of the product.

In this embodiment, the water inlet opening 12 is defined in the bottom portion of the lower housing 102. By providing the water inlet opening 12 in the bottom portion of the lower housing 102, it is convenient for the liquid to be sucked in.

In this embodiment, a bottom portion of the housing 10 is provided with a plurality of support portions 13. Preferably, a total number of the support portions 13 is three, and the support portions 13 are arranged in a triangular pattern on a bottom outer wall of the housing 10. The arrangement in the triangular pattern enhances the stability of the product during use.

In this embodiment, the housing 10 is made of transparent material, and the use of the transparent material in the housing 10 enhances the lighting effect and improves the overall effect of the product.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A temperature measurable fountain lamp, comprising: a housing, wherein the housing is provided with an accommodating cavity and a water inlet opening, and the water inlet opening is used for allowing liquid to enter the accommodating cavity;
    a temperature measuring device, wherein the temperature measuring device comprises a probe and a display electrically connected to the probe, the probe is positioned on a lower side of the housing, the display is positioned on the housing, the probe and one part of the housing are used for being placed into the liquid, so that the probe is capable of being used for measuring a temperature value of the liquid, and the display is used for displaying the temperature value of the liquid;
    a pump device, wherein the pump device is installed in the accommodating cavity, and the pump device is in communication with the water inlet opening for spraying the liquid to form a fountain;
    a lighting device, wherein the lighting device is installed inside the accommodating cavity for emitting light out of the housing; and
    a control motherboard, wherein the control motherboard is electrically connected to the lighting device, the pump device, the probe, and the display, so that the lighting device, the pump device, the probe, and the display are controllably driven;
    wherein the housing comprises an upper housing and a lower housing; a first installation opening is defined in an upper side of the lower housing; the control motherboard, the lighting device, and the pump device are all arranged in the accommodating cavity through the first installation opening; the probe is partially positioned in the accommodating cavity and partially passes through a bottom portion of the lower housing to extend out of the lower housing; the display is partially positioned inside the accommodating cavity and partially extends out of the upper housing; and the upper housing is configured for sealing and covering the lower housing through the first installation opening.

2. The temperature measurable fountain lamp according to claim 1, wherein the pump device is provided with a conveying pipeline in communication with the water inlet opening; the conveying pipeline is used for conveying liquid; a top portion of the upper housing is equipped with a water outlet portion; the upper housing is provided with a first installation groove adapted to the water outlet portion; the water outlet portion is clamped in the first installation groove; and the water outlet portion is in communication with the conveying pipeline.

3. The temperature measurable fountain lamp according to claim 1, wherein the lower housing further comprises a sealing ring; and when the upper housing seals and covers the first installation opening, an inner side wall of the first installation opening and an outer side wall of the upper housing press the sealing ring, so that the sealing ring presses and seals the upper housing inside the first installation opening.

4. The temperature measurable fountain lamp according to claim 3, wherein a bottom inner wall of the lower housing is provided with a second installation groove, a sensing plate, and a pressing plate; the sensing plate is installed in the second installation groove; the sensing plate is electrically connected to the control motherboard; the pressing plate is positioned above the sensing plate; and two ends of the pressing plate are respectively fixed to the second installation groove for fixing the sensing plate in the second installation groove.

5. The temperature measurable fountain lamp according to claim 1, wherein a top portion of the upper housing is also provided with a plurality of pressing members; the control motherboard is provided with buttons corresponding to the pressing members; the upper housing is provided with a second installation opening; the pressing members and the second installation opening are both positioned above the buttons; and the pressing members are configured fir sealing and covering the second installation opening.

6. The temperature measurable fountain lamp according to claim 1, further comprising a power storage module, wherein the power storage module is electrically connected to the control motherboard; and the power storage module is installed in the accommodating cavity through the first installation opening.

7. The temperature measurable fountain lamp according to claim 3, wherein an identical side of the upper housing and the lower housing extends outward to form a hollow flat structure; and an inner portion of the flat structure is in communication with the first installation opening.

8. The temperature measurable fountain lamp according to claim 5, wherein the pressing members comprise a first pressing member; the buttons comprise a first button corresponding to the first pressing member; and the first pressing member drives the first button under an external force for switching between a continuous water spraying mode and an intermittent water spraying mode.

9. The temperature measurable fountain lamp according to claim 6, wherein the upper housing is also provided with a charging interface and a cover; the charging interface is electrically connected to the control motherboard; the charging interface is used for providing electrical energy to the power storage module; the upper housing is also provided with a third installation opening; the charging interface is provided in the third installation opening; and the cover is used for covering the third installation opening.

10. The temperature measurable fountain lamp according to claim 7, wherein the lower housing further comprises a floating member; and the floating member is arranged inside the flat structure through the first installation opening.

11. The temperature measurable fountain lamp according to claim 8, wherein the pressing members further comprise a second pressing member; the buttons further comprise a second button corresponding to the second pressing member; and the second button is used for switching a temperature display mode.

12. The temperature measurable fountain lamp according to claim 1, wherein the control motherboard is equipped with a second connecting member; and the control motherboard is connected to the upper housing through the second connecting member.

13. The temperature measurable fountain lamp according to claim 12, wherein the control motherboard is further provided with sockets; and the display is electrically connected to the control motherboard through the sockets.

14. The temperature measurable fountain lamp according to claim 13, wherein the display is provided with pins; and the pins are inserted into the sockets to electrically connect the display to the control motherboard.

15. The temperature measurable fountain lamp according to claim 1, wherein the lighting device is an LED light; the LED light is positioned on a lower side of the control motherboard; and a light emitting surface of the LED light is arranged towards a direction of a lower side of the lower housing.

16. The temperature measurable fountain lamp according to claim 15, wherein the LED light is capable of emitting colored light with alternating flashing colors under the control of the control motherboard.

17. The temperature measurable fountain lamp according to claim 1, wherein the water inlet opening is defined in the bottom portion of the lower housing.

18. The temperature measurable fountain lamp according to claim 1, wherein a bottom portion of the housing is provided with a plurality of support portions.

19. The temperature measurable fountain lamp according to claim 1, wherein the housing is made of transparent material.

* * * * *